(12) United States Patent
Ansari et al.

(10) Patent No.: US 8,782,687 B2
(45) Date of Patent: Jul. 15, 2014

(54) MULTI-PLATFORM DIGITAL TELEVISION

(75) Inventors: Ahmad Ansari, Austin, TX (US); David Hartman, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1468 days.

(21) Appl. No.: 10/427,706

(22) Filed: Apr. 30, 2003

(65) Prior Publication Data

US 2004/0221302 A1 Nov. 4, 2004

(51) Int. Cl.
*H04N 7/167* (2011.01)
*H04N 7/173* (2011.01)
*H04N 7/16* (2011.01)

(52) U.S. Cl.
USPC .............. 725/31; 725/131; 725/134; 725/151

(58) Field of Classification Search
USPC ........................................... 725/133, 63–104
See application file for complete search history.

(56) References Cited

U.S. PATENT DOCUMENTS

| | | | |
|---|---|---|---|
| 5,936,660 A | 8/1999 | Gurantz | |
| 5,982,411 A | 11/1999 | Eyer et al. | |
| 5,990,928 A | 11/1999 | Sklar et al. | |
| 6,133,910 A | 10/2000 | Stinebruner | |
| 6,157,377 A * | 12/2000 | Shah-Nazaroff et al. | 715/719 |
| 6,195,692 B1 | 2/2001 | Hsu | |
| 6,262,780 B1 | 7/2001 | Ho et al. | |
| 6,298,400 B1 | 10/2001 | Candelore | |
| 6,305,021 B1 | 10/2001 | Kim | |
| 6,317,168 B1 | 11/2001 | Seo | |
| 6,321,382 B1 | 11/2001 | Wugofski | |
| 6,442,593 B1 | 8/2002 | Wang et al. | |
| 6,459,427 B1 | 10/2002 | Mao et al. | |
| 6,466,671 B1 | 10/2002 | Maillard et al. | |
| 6,486,925 B1 | 11/2002 | Ko | |
| 6,501,514 B1 | 12/2002 | Townsend et al. | |
| 6,507,952 B1 | 1/2003 | Miller et al. | |
| 6,742,182 B1 * | 5/2004 | Perlman | 725/25 |
| 7,120,250 B2 * | 10/2006 | Candelore | 380/200 |
| 7,278,153 B1 * | 10/2007 | Sanders | 725/115 |
| 7,336,787 B2 * | 2/2008 | Unger et al. | 380/217 |
| 7,568,208 B1 * | 7/2009 | Dinwiddie et al. | 725/30 |
| 2002/0170072 A1 | 11/2002 | Lundbald et al. | |
| 2002/0174270 A1 | 11/2002 | Stecyk et al. | |
| 2002/0199202 A1 * | 12/2002 | Hunter | 725/105 |
| 2003/0046713 A1 * | 3/2003 | Bontempi | 725/151 |
| 2003/0081686 A1 * | 5/2003 | Jung et al. | 375/240.25 |
| 2003/0093812 A1 * | 5/2003 | Chang et al. | 725/133 |
| 2003/0145331 A1 * | 7/2003 | Escobar et al. | 725/110 |
| 2003/0154493 A1 * | 8/2003 | Kagle et al. | 725/114 |
| 2004/0177384 A1 * | 9/2004 | Kahn | 725/140 |
| 2004/0205812 A1 * | 10/2004 | Candelore | 725/31 |
| 2004/0237098 A1 * | 11/2004 | Watson et al. | 725/25 |
| 2004/0261112 A1 * | 12/2004 | Hicks et al. | 725/89 |
| 2005/0160448 A1 * | 7/2005 | Duffield et al. | 725/2 |
| 2005/0165937 A1 * | 7/2005 | Genevois | 709/229 |
| 2005/0193415 A1 * | 9/2005 | Ikeda | 725/49 |
| 2006/0059095 A1 * | 3/2006 | Akins et al. | 705/51 |
| 2009/0031335 A1 * | 1/2009 | Hendricks et al. | 725/1 |

* cited by examiner

*Primary Examiner* — Mushfikh Alam
(74) *Attorney, Agent, or Firm* — Guntin & Gust, PLC; Douglas Schnabel

(57) ABSTRACT

A multi-platform television comprises at least one television signal interface to receive premium television services from at least two different television service providers. The television further comprises a programmable conditional access system to enable conditional access to the premium television services received by the at least one television signal interface from the at least two different service providers.

12 Claims, 1 Drawing Sheet

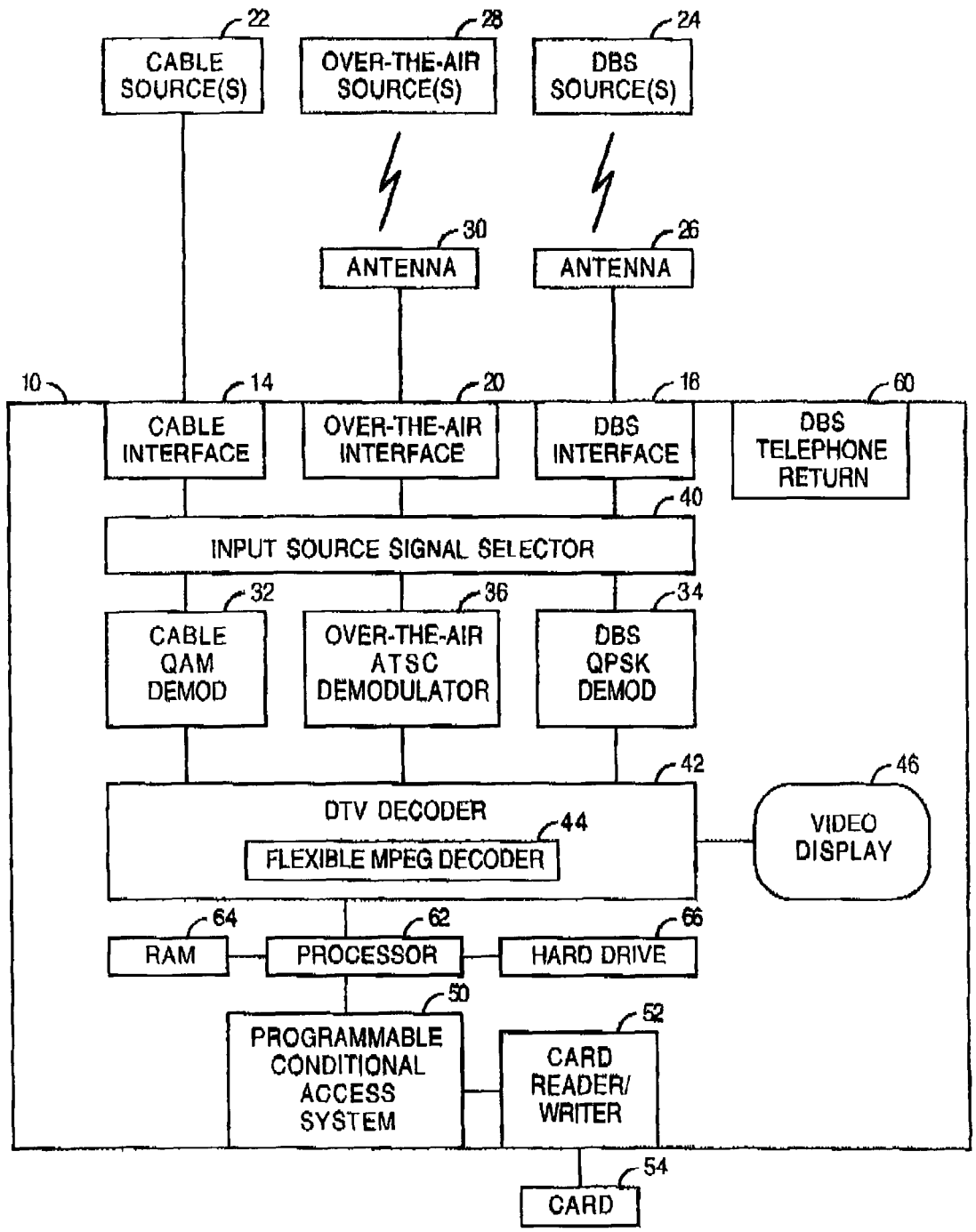

MULTI-PLATFORM DIGITAL TELEVISION

BACKGROUND OF THE INVENTION

1. Field of the Invention

The present invention relates to digital television sets.

2. Description of the Related Art

Until recently, substantially the only option for consumers to access digital television was to acquire a set-top box. However, a new alternative in the form of an integrated digital television set is emerging. The integrated digital television set provides a single unit that allows consumers to directly access digital content. These units are able to receive free-to-air digital signals usually through a conventional television antenna without the need for a set-top box. However, cable television and direct broadcast satellite (DBS) are dominant video entertainment service providers whose needs are not fully met with current integrated digital television sets.

BRIEF DESCRIPTION OF THE DRAWINGS

The present invention is pointed out with particularity in the appended claims. However, other features are described in the following detailed description in conjunction with the accompanying drawing in which:

FIG. 1 is a block diagram of an embodiment of a multi-platform digital television.

DETAILED DESCRIPTION OF THE PREFERRED EMBODIMENTS

The present invention provides an integrated digital television set compatible with over-the-air, cable and direct broadcast satellite (DBS) television service distribution means. The integrated digital television set handles multiple premium television services offered by cable and DBS television service providers in a seamless manner and without an additional set-top box. Examples of the premium television services include, but are not limited to, pay-per-view, video-on-demand and interactive television services. The integrated digital television set provides a common platform that enables digital television set manufacturers to address the needs of cable television service providers and their subscribers, and DBS television service providers and their subscribers.

FIG. 1 is a block diagram of an embodiment of a multi-platform digital television 10. The television 10 comprises one television signal interface 12 to receive television signals from at least one source. Preferably, the at least one television signal interface 12 comprises a cable television signal interface 14, a direct broadcast satellite interface 16 and an over-the-air television signal interface 20. Each of the interfaces 14, 16 and 20 may comprise a respective coaxial cable jack, for example.

The cable television signal interface 14 is to receive television signals from a cable television source 22. The cable television source 22 communicates the television signals to the user via a cable plant. The direct broadcast satellite television signal interface 16 is to receive television signals from a direct broadcast satellite source 24 using an external antenna 26 such as a dish antenna. Examples of the direct broadcast satellite source 24 include those marketed under the Echostar™ brand and the DirecTV™ brand. The over-the-air television signal interface 20 is to receive television signals from over-the-air sources 28 using an external antenna 30. The over-the-air sources 28 are terrestrial sources that broadcast local channels.

The television 10 further comprises a cable demodulator 32, a direct broadcast satellite demodulator 34 and an over-the-air demodulator 36. The cable demodulator 32 is to demodulate television signals received via the cable television signal interface 14. The cable demodulator 32 may comprise a quadrature amplitude modulation (QAM) demodulator and/or a vestigial sideband (VSB) demodulator. The QAM demodulator may comprise a 64-QAM demodulator and/or a 256-QAM demodulator. The VSB demodulator may comprise a 16-VSB demodulator, which demodulates a 16-level version of United States terrestrial broadcasts with 4 bits per symbol and no forward error correction (FEC).

The direct broadcast satellite demodulator 34 is to demodulate television signals received via the direct broadcast satellite television signal interface 16. The direct broadcast satellite demodulator 34 may comprise a quaternary phase shift keying (QPSK) demodulator. The QPSK demodulator demodulates a digital transmission over frequency modulated (FM) carriers using QPSK, which is similar to QAM but without substantial amplitude variations.

The over-the-air demodulator 36 is to demodulate television signals received via the over-the-air television signal interface 20. The over-the-air demodulator 36 may comprise an Advanced Television Systems Committee (ATSC) demodulator to demodulate 8-VSB modulation signals used for terrestrial broadcasting in the United States. The signal has a carrier at the same frequency as the current analog carrier for each channel allocation. The carrier is amplitude modulated at one of eight possible levels about at a 6 MHz rate. Filters limit the total bandwidth to the 6 MHz channel allocation to avoid adjacent channel interference.

The television 10 comprises an input source selector 40 to identify which of the interfaces 14, 16 and 20 is a source of a user-selected channel. The channel may be user-selected using a remote control and/or a channel selecting interface integrated with the television 10. The input source selector 40 identifies a television signal received on the user-selected channel and determines the nature of the television signal. This process is done automatically by detecting the modulation-type of the television signal. The television signal is directed to an appropriate one of the demodulators 32, 34 and 36 based on said detecting the modulation-type. The appropriate one of the demodulators 32, 34 and 36 performs either ATSC demodulation, QAM demodulation or QPSK demodulation on the television signal. It is noted that the demodulators 32, 34 and 36 can be embodied by a single programmable demodulation unit that performs the task of demodulating all three different types of modulated signals.

The television 10 comprises a digital television (DTV) decoder 42 to decode demodulated digital television signals from the demodulators 32, 34 and 36 in real-time. The DTV decoder 42 has modes to decode various DTV formats, such as high definition (HD) formats and standard definition (SD) formats. Preferably, the DTV decoder 42 is capable of decoding signals that are interlaced (e.g. a 1920×1080i HD resolution signal) and progressive (e.g. a 1280×720p HD resolution signal). The DTV decoder 42 is also capable of decoding full resolution SD signals (e.g. a 720×480i resolution signal).

The DTV decoder 42 comprises a Moving Picture Experts Group (MPEG) decoder 44 to decode data compressed based on an MPEG-based protocol. In one embodiment, the MPEG decoder 44 is capable of decoding data compressed based on MPEG-2. As subsequent MPEG standards are deployed, the MPEG decoder 44 may be based thereon.

Preferably, the MPEG decoder 44 is flexible to enable decoding of at least two different versions of MPEG streams (e.g. at least two different versions of MPEG-2 streams). For example, a standard version of MPEG-2 technology is specified for ATSC terrestrial broadcasting, digital cable transmission as specified by the Society for Cable Telecommunications Engineers (SCTE), and Echostar™ s direct broadcast satellite transmissions. However, a second version of MPEG-2, which differs slightly from the standard version, is used by DirecTV™. Thus, it is preferred that the MPEG decoder 44 be capable of decoding ATSC, SCTE, Echostar™, and DirecTV™ versions of MPEG-2 streams. In general, the MPEG decoder 44 may be programmable to allow any number of different forms of MPEG-2 or another MPEG-based format to be decoded.

The DTV decoder 42 sends a resulting decoded video signal to a display 46 integrated with the television 10. The display 46 may comprise a cathode ray tube (CRT), a liquid crystal display (LCD), a plasma display, or another display technology to display the resulting decoded video for view. The display 46 displays video based on the resulting decoded video signal.

The television 10 comprises a programmable conditional access system (PCAS) 50 to allow different service providers to offer premium services using a common interface. The PCAS 50 provides a common hardware platform for conditional access of premium television services from direct broadcast satellite and cable service providers. The PCAS 50 may comprise a card reader/writer 52 or an alternative data reader/writer to read/program conditional access (CA) and digital rights management (DRM) data to a removable card 54 or an alternative machine-readable storage medium. The removable card 54 or alternative machine-readable storage medium may comprise a magnetic storage medium, an electronic storage medium, or an optical storage medium, for example. One example of the removable card 54 is a programmable PCMCIA-like card.

Each television service provider can program the removable card 54 with its own version of conditional access (CA) and digital rights management (DRM). In particular, the removable card 54 contains service-provider-specific CA data and DRM data. Thus, the same hardware interface is used for multiple, if not all, premium television service providers. When changing service providers, the user replaces the removable card 54 with another removable card having CA and DRM data specific to the new service provider. The card reader 52 reads the service-provider-specific CA and DRM data to enable display premium channels to be displayed the display 46.

To further illustrate use of the PCAS 50, consider a first television service provider that provides a first premium television service and a second television service provider that provides a second premium television service. The first and second premium television service providers may be two different cable television service providers, two different direct broadcast satellite television service providers, or one cable television service provider and one direct broadcast satellite television service provider.

The PCAS 50 enables conditional access to both the first premium television service and the second premium television service. The PCAS 50 provides a first version of CA and DRM for the first premium television service and a second version of CA and DRM for the second premium television service. The two versions of CA and DRM may simultaneously reside in the PCAS 50 and/or the removable card 54. This is beneficial when the television 10 is used to receive premium channels from both a cable television service provider and a direct broadcast satellite television service provider. Alternatively, the second version of CA and DRM can reside in the PCAS 50 and/or the removable card 54 after the first version of CA and DRM has resided therein. This is beneficial when the user has changed service providers (e.g. one cable provider to another cable provider, one DBS provider to another DBS provider, a cable provider to a DBS provider, or a DBS provider to a cable provider) to supply premium channels to the television 10.

Optionally, the PCAS 50 may be programmed by signals received via the cable interface 14, the direct broadcast satellite interface 16, the over-the-air interface 20, or the DBS telephone return interface 60. In this case, each television service provider can send its own specific CA and/or DRM data to the television 10, which in turn is written to the removable card 54.

Using the PCAS 50, each television service provider has the freedom of implanting its own version of CA and DRM, and consumers have the freedom of changing service providers without having to change their television set or acquire a new set-top box.

To enable two-way communication with the DBS source 24, the television 10 comprises a DBS telephone return interface 60, such as those implemented in conventional DBS set-top boxes. Two-way communication with the cable source 22 is facilitated via the cable interface 14 and the cable plant.

The television 10 comprises a processor 62 such as a central processing unit (CPU) and a memory 64 such as a random access memory (RAM) to provide controls and management functionality therefor. The television 10 may comprise an optional hard drive 66 or alternative re-writeable storage medium to provide personal video recording (PVR) features.

Preferably, all of the components illustrated within the block representing the television 10 in FIG. 1 are integrated into a single television set. For example, it is preferred that none of the aforementioned components be associated with a set-top box separable from the television 10. However, the scope of this disclosure should be construed to broadly contemplate embodiments where at least one of the aforementioned components is located in a set-top box separable from the television 10. For example, the features described with reference to the programmable conditional access system 50 may implemented in set-top boxes. It is also noted that a memory integrated with the PCAS 50 may be substituted for the removable card 54 in alternative embodiments.

It will be apparent to those skilled in the art that the disclosed inventions may be modified in numerous ways and may assume many embodiments other than the preferred forms specifically set out and described herein.

Accordingly, it is intended by the appended claims to cover all modifications which fall within the true spirit and scope of the present invention.

What is claimed is:

1. An apparatus comprising:
   a processor; and
   a memory that stores executable instructions that, when executed by the processor, facilitate performance of operations, comprising:
   receiving a first input signal and a second input signal;
   detecting a first modulation type of the first input signal and a second modulation type of the second input signal;
   demodulating the first input signal at a cable demodulator to generate a first demodulated signal if the first modulation type corresponds to cable television or at a satellite demodulator to generate the first demodulated signal if the first modulation type corresponds to satellite television;
   demodulating the second input signal at the cable demodulator to generate a second demodulated signal if the second modulation type corresponds to the cable television or at the satellite demodulator to generate the second demodulated signal if the second modulation type corresponds to the satellite television;

reading, from a removable memory card, first conditional access and digital rights management data associated with a cable service provider and second conditional access and digital rights management data associated with a first satellite service provider;

enabling cable television services of the cable service provider according to the first conditional access and digital rights management data and first satellite television services of the first satellite services provider according to the second conditional access and digital rights management data;

decoding the first demodulated signal to generate a first decoded signal;

decoding the second demodulated signal to generate a second decoded signal;

presenting the first decoded signal and the second decoded signal at a display according to a channel selection; and receiving a third conditional access and digital rights management data associated with a second satellite service provider;

responsive to receiving the conditional access and digital rights management data:
  storing the third conditional access and digital rights management data at the removable memory card;
  disabling the first satellite television services of the first satellite service provider; and
  enabling second satellite television services of the second satellite service provider.

2. The apparatus of claim 1, comprising computer instructions which, responsive to being executed by the processor, cause the processor to further perform operations comprising:
  receiving the second conditional access and digital rights management data from the first satellite service provider; and
  storing the second conditional access and digital rights management data in the removable memory card.

3. The apparatus of claim 1, comprising computer instructions which, responsive to being executed by the processor, cause the processor to perform operations further comprising storing the first conditional access and digital rights management data or the second conditional access and digital rights management data at the memory, wherein the first conditional access and digital rights management data or the second conditional access and digital rights management data that is stored in the memory is accessible to the processor when the removable card is removed from the apparatus.

4. The apparatus of claim 1 wherein the first decoded signal and the second decoded signal comprise two different versions of moving picture experts group encoding.

5. The apparatus of claim 4 wherein the two different versions of moving picture experts group encoding comprise version of moving picture experts group-2 encoding.

6. An apparatus comprising:
a processor; and
a memory that stores executable instructions that, when executed by the processor, facilitate performance of operations, comprising:
  receiving a first premium television signal and a second premium television signal;
  reading, from a removable memory card, first conditional access and digital rights management data associated with a first premium television service provider and second conditional access and digital rights management data associated with a second premium television service provider;
  enabling first premium television services according to the first conditional access and digital rights management data and second premium television services according to the second conditional access and digital rights management data;
  detecting a first type of the first premium television signal and a second type of the second premium television signal, wherein the first type and the second type each correspond to cable television or satellite television;
  decoding the first premium television signal to generate a first decoded signal responsive to enabling the first premium television services and responsive to determining the first type of the first premium television signal;
  decoding the second premium television signal to generate a second decoded signal responsive to enabling the second premium television services and responsive to determining the second type of the second premium television signal;
  selectively presenting the first decoded signal or the second decoded signal at a display according to a channel selection;
  receiving a third conditional access and digital rights management data associated with a third premium television service provider;
  responsive to receiving the conditional access and digital rights management data:
    storing the third conditional access and digital rights management data at the removable memory card;
    disabling the second premium television services of the second premium television service provider; and
    enabling third premium television services of the third premium television service provider.

7. The apparatus of claim 6, wherein the first premium television signal is a cable television signal and the second premium television signal is a satellite television signal.

8. The apparatus of claim 7 comprising computer instructions which, responsive to being executed by the processor, cause the processor to further perform operations comprising:
  receiving an over-the-air television signal; and
  demodulating the over-the-air television signal by advanced television systems committee demodulation.

9. The apparatus of claim 7 comprising computer instructions which, responsive to being executed by the processor, cause the processor to further perform operations comprising demodulating the cable television signal by quadrature amplitude modulation demodulation.

10. The apparatus of claim 7 comprising computer instructions which, responsive to being executed by the processor, cause the processor to further perform operations comprising demodulating the satellite television signal by quaternary phase shift keying demodulation.

11. The apparatus of claim 6, comprising computer instructions which, responsive to being executed by the processor, cause the processor to further perform operations comprising:
  receiving the second conditional access and digital rights management data from the second premium television service provider; and
  storing the second conditional access and digital rights management data in the removable memory card.

12. A digital television device, comprising:
a processor; and
a memory that stores executable instructions that, when executed by the processor, facilitate performance of operations, comprising:
  receiving a first television signal and a second television signal;
  detecting a first modulation type of the first television signal and a second modulation type of the second television signal;
  determining if the first modulation type corresponds to cable or satellite television and if the second modulation type corresponds to cable or satellite television;
  demodulating the first television signal and the second television signal at a cable demodulator to generate a first demodulated signal and a second demodulated signal if the first modulated type and the second modulation type correspond to cable television, or demodulating the first television signal and the second television signal at a satellite demodulator to generate the first demodulated signal and the second demodulated signal if the first modulated type and the second modulation type correspond to satellite television;
  decoding, the first demodulated signal to generate a first decoded signal and the second demodulated signal to generate a second decoded signal;
  reading, from a removable memory card, first conditional access and digital rights management data associated with a first cable television service provider and second conditional access and digital rights management data associated with a satellite television service provider;
  enabling first cable television services according to the first conditional access and digital rights management data and satellite television services according to the second conditional access and digital rights management data;
  presenting the first decoded signal at a display responsive to enabling cable television services;
  presenting the second decoded signal at the display responsive to enabling satellite television services;
  receiving a third conditional access and digital rights management data associated with a second cable service provider;
  responsive to receiving the conditional access and digital rights management data:
    storing the third conditional access and digital rights management data at the removable memory card;
    disabling the first cable television services of the first cable service provider; and
    enabling second cable television services of the second cable service provider.

* * * * *